Feb. 12, 1924.

C. S. CHALFANT

Re. 15,765

SPARK ARRESTER FOR LOCOMOTIVES

Original Filed Nov. 26, 1920 2 Sheets-Sheet 1

INVENTOR:
Cotter S. Chalfant
By E. J. Andrews
Atty.

Feb. 12, 1924. Re. 15,765

C. S. CHALFANT

SPARK ARRESTER FOR LOCOMOTIVES

Original Filed Nov. 26, 1920 2 Sheets-Sheet 2

INVENTOR:
Cotter S. Chalfant
By E. J. Andrews
Att'y.

Reissued Feb. 12, 1924. Re. 15,765

UNITED STATES PATENT OFFICE.

COTTER S. CHALFANT, OF CHICAGO, ILLINOIS.

SPARK ARRESTER FOR LOCOMOTIVES.

Original No. 1,408,075, dated February 28, 1922, Serial No. 426,643, filed November 26, 1920. Application for reissue filed March 9, 1923. Serial No. 624,025.

*To all whom it may concern:*

Be it known that I, COTTER S. CHALFANT, a citizen of the United States, and a resident of Chicago, in the county of Cook and State of Illinois, have invented a new and useful Improvement in Spark Arresters for Locomotives, of which the following is a full, clear, and exact description.

My invention relates to improvements in spark arresters for locomotives, and it consists in the combination, constructions and arrangements herein described and claimed. An object of my invention is to provide a device for separating the sparks, cinders, and other unconsumed substances from the gases of combustion in a locomotive engine and for returning the same to the furnace of the engine for further consumption, whereby the efficiency of the engine is increased and loss resulting from the igniting of adjacent property by sparks from the engine is obviated. A further object of my invention is to provide a device of the type described, that can be operatively applied to a locomotive engine of conventional construction without interfering in any way with the functioning of the relatively moving parts ordinarily provided therein. A further object of my invention is to provide a device of the type described that is relatively simple in construction and operation, thoroughly effective for the purpose intended, and practical commercially. Other objects and advantages will appear in the following specification, and the novel features of the invention will be particularly pointed out in the appended claims.

Figure 1:
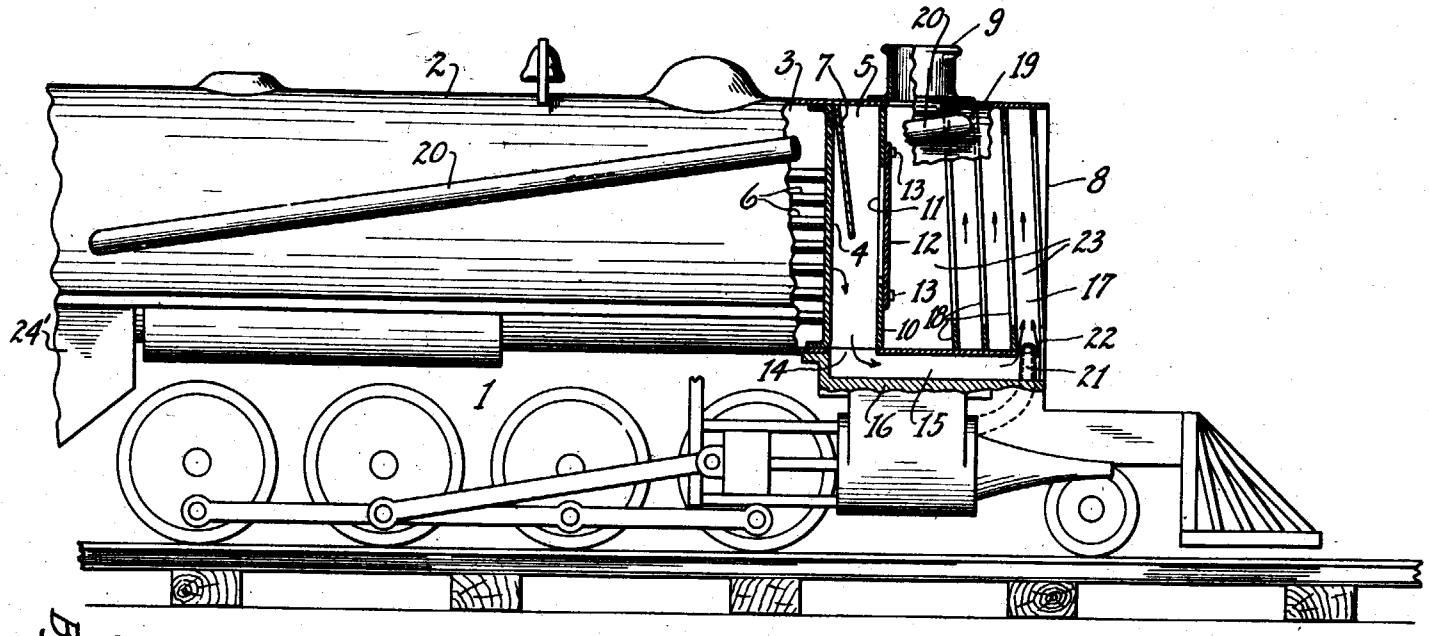
Figure 4:
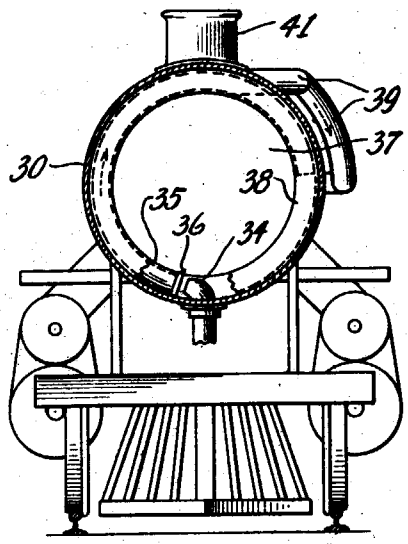
Figure 2:
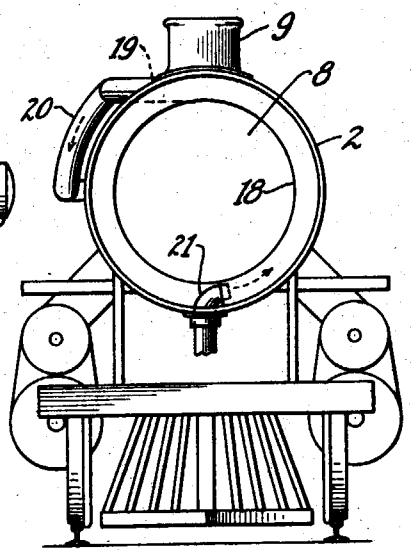
Figure 3:
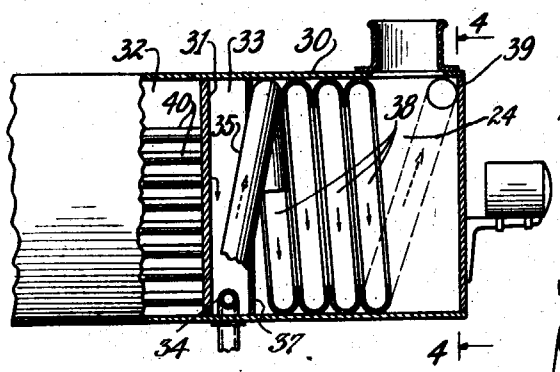

My invention is illustrated in the accompanying drawings, forming a part of this application in which Fig. 1 is a side elevation showing the preferred form of the device operatively applied to a locomotive engine, portions being broken away and other portions shown in section; Fig. 2 is a front view of the mechanism shown in Fig. 1; Fig. 3 is a side elevation, partly in section, of a fragmentary portion of a locomotive engine, showing a modified form of the device applied thereto; and Fig. 4 is a sectional view along line 4—4 of Fig. 3 of the locomotive engine, showing the modified form of the device operatively applied.

It is well known that a large percentage of the fuel fed into a furnace of a locomotive engine is ejected through the smoke stack without being entirely consumed and that therefore a distinct gain in efficiency of the engine will be attained by providing means for separating the unconsumed portions of the fuel from the gases of combustion and for returning such unconsumed portions to the furnace of the engine. In addition the loss resulting from fires occasioned by the igniting of adjacent property by sparks ejected through the smoke stack of an engine is comparatively great. Such a loss will be obviated when adequate means for preventing ejection of sparks through the smoke stack are provided.

Devices of which I am aware for obtaining the results set forth above, while no doubt theoretically operative, have been found unsatisfactory in actual service in that such devices involve complicated structures, or interfere with the ordinary functioning of operating parts of the engine. When my device is applied to a locomotive engine, the results sought are obtained without interfering in any way with the functioning of the parts of the engine and without the necessity of providing a complicated or costly structure, and without expensive changes being required in the ordinary structure of the locomotive engine to which the devices are applied.

In carrying out my invention I may make use of a locomotive engine of the type intended for passenger service, such as is indicated generally at 1 in Fig. 1 of the drawings. The engine is provided with the usual shell 2 having fitted therein a head 4 to divide the interior thereof into a water chamber 3 and a flue outlet chamber 5. The gases of combustion from a fire box 24′, that is positioned in the rear part of the engine, pass through tubes 6 that are disposed in the water chamber 3 and open through the head 4 into the outlet chamber 5. A baffle plate 7 positioned within the outlet chamber 5 deflects the gases of combustion, passing from the tubes 6, downwardly in the outlet chamber 5. The shell 2 is formed with its front end open, as at 8 and is also provided with a smoke stack 9.

9 plate 10 is fitted in front of the outlet chamber 5 substantially parallel with the head 4 and to the rear of the smoke stack 9 as clearly shown in the drawings. The plate 10 is provided with a central opening 11 normally closed by a cover plate 12 secured thereto in any suitable manner as by means of bolts 13. The gases of combustion deflected downwardly by the baffle plate 7 pass through an opening 14 into a passage 15 between the exterior wall of the shell 2 and a saddle or cylinder block 16. From the passage 15 the gases are conducted through an opening 22 into the chamber 23 in the front end of the engine shell 2. A continuous spiral channel 17 within the chamber 23 is provided by securing inwardly extending spirally directed fins 18 to the inner wall of the shell 2 in any suitable manner as by welding the outer edges of the fins to the shell. One end of the channel 17 communicates with the opening 22 while the other end thereof communicates with a tubular member 20 at a point adjacent the throat of the smoke stack 9. The tubular member 20 passes through the shell 2 at 19 as best seen in Figure 2 and extends to the fire box 24'.

From the foregoing description of the various parts of the device, the operation thereof may be readily understood. The gases of combustion passing through the tubes 6 entrain cinders, sparks and partly consumed fuel substances. Such substances pass with the gases along the passage 15 and into the spiral channel 17. The exhaust pipe 21 from the power cylinders of the engine opens into the channel 17 at this point and forces the gases of combustion and the unconsumed substances along the spiral channel 17 at a high velocity and under the influence of centrifugal force. Air will be drawn from the atmosphere through the opening 8 and will entrain the light gases of combustion from the channel 17, conducting the same through the smoke stack 9 to the atmosphere. The cinders, sparks and other unconsumed particles will remain in the channel 17 on account of their relatively great weight and will pass therefrom into the tubular member 20 and thence to the furnace of the engine. It will thus be seen that the operation described will be repeated until all the solid substances fed into the furnace are reduced to a gaseous state.

Referring now to Figs. 3 and 4, I show a modified form of the device applied to an engine of the type designed primarily for freight service. In the drawings 30 denotes the shell which has fitted therein a head 31 to provide a water chamber 32 and an outlet chamber 33. The gases of combustion pass through tubes 40, disposed in the water chamber 32, that open through the head 31 into the outlet chamber 33 and are drawn into a conduit 35 having a bell end 36 positioned above and facing an exhaust pipe 34 from the power cylinders. The conduit 35 is spirally directed as shown and passes into a smoke chamber 24 through a plate 37, that closes the outlet chamber 33, parallel with the head 31. After passing through the plate 37 the conduit 35 is continued as a spirally directed channel 38 that is semi-cylindrical in cross section and is arranged to communicate with a tubular member 39 at a point adjacent to the front end of the engine and near the throat of the smoke stack 41. The tubular member 39 passes through the shell 30 and extends to the furnace, not shown, of the engine.

The operation of this modified form of the device is similar to that of the device hereinbefore set forth. The gases of combustion together with the entrained cinders, sparks, and other substances not entirely consumed in the furnace pass from the tubes 40 and, on account of the suction thereon created by the exhausting of steam from the power cylinders in the tube 35, are drawn into the latter and pass along the channel 38. It will be noted that the convolution of the spiral channel adjacent the front end of the engine has a portion of its length positioned in the shell 30 at the rear of the smoke stack 41 while the remaining portion thereof is positioned in the shell 30 at the opposite side of the smoke stack. Consequently the light gases of combustion will pass through the smoke stack while the heavier cinders, sparks, and other substances will remain within the channel 38 and will pass therefrom into the tubular member 39 and thence be returned to the furnace of the engine.

When the engine is operating normally the effect of the escaping exhaust steam will be to reduce the gas pressure in the chamber 33 below the atmospheric pressure and at the same time the effect will be to raise the pressure in chamber 24 above the atmospheric pressure. Hence the gases of combustion will pass freely into chamber 33, and the cinders will be forced by the gas pressure through the cinder outlet into the member 39.

The device is thoroughly effective for the purpose intended and can be installed in any engine of standard construction at slight cost and without interfering in any way with the normal operation thereof. And it is obvious that a great saving in fuel will result and that the efficiency of the engine will be greatly increased.

I claim as my invention:

1. The combination with a flue outlet chamber and a smoke outlet chamber at the front end of a locomotive engine, said smoke outlet chamber being provided with a stack, and said flue outlet chamber having an inlet for a pressure fluid, of a spiral conduit arranged in said chambers with one open end thereof positioned directly above the inlet for the pressure fluid and with the other end thereof positioned directly beneath and adjacent to the stack orifice, means for conducting the gases of combustion from the fire tubes with the entrained unconsumed solid substances into position to enter the conduit at its first named end, and a declined conduit communicating with the spiral conduit at its last named end and leading to the fire box of the engine for conducting the unconsumed solid substances to the latter.

2. In an engine having fire tubes, the combination of an outlet chamber at the front end of the engine, said fire tubes opening into said chamber, said chamber having an inlet for pressure fluid, a second chamber having a smoke stack connected therewith, a conduit having one end open and positioned in said outlet chamber facing said inlet, said conduit passing spirally from said end part way around said chamber and into said second chamber, and means arranged to receive and dispose of cinders, said means projecting into said second chamber and being operatively associated with the portion of said spiral conduit which is nearer the stack.

3. In an engine having fire tubes, the combination of an outlet chamber near the front end of the engine, said fire tubes opening into said chamber, said chamber having an inlet for pressure fluid, a second chamber having a smoke stack, a conduit having one end open and positioned in said outlet chamber, and extending spirally from said end around the wall of said chamber and into said second chamber, a passageway arranged to receive and dispose of cinders, said passageway opening into said second chamber, and means operatively connecting said passageway with said conduit.

4. In an engine a fire tube, a flue outlet chamber and a smoke outlet chamber positioned adjacent thereto and in the forward end of said engine, a substantially airtight partition separating said two chambers, a steam exhaust pipe opening into said flue chamber, a conduit having one end open and positioned in said smoke chamber, said conduit passing adjacent the wall of said flue chamber through said partition and opening into said smoke chamber, a smoke stack opening into said smoke chamber, an outlet for cinders opening into said smoke chamber, and means in said smoke chamber extending around the wall thereof and connecting the end of said conduit therein with said cinder outlet.

5. In an engine, a combination of a flue outlet chamber, and a smoke outlet chamber, a steam exhaust pipe opening into said flue chamber, and a smoke stack opening into said smoke chamber, a conduit opening into said flue chamber and passing into said smoke chamber, a cinder receiving device opening into said smoke chamber, and a channel passing around the inner surface of the wall of said smoke chamber, said channel being operatively connected with said conduit and with said cinder device and being adapted to convey cinders from said conduit to said device.

6. In an engine, a smoke chamber, means for passing steam exhaust from the engine into said chamber, a smoke stack connected with said chamber, a channel being operatively connected with said exhaust means and passing spirally around the inner surface of the wall of said chamber towards said smoke stack, and a cinder outlet opening into said chamber and being operatively connected with said channel.

7. In an engine, a smoke chamber, means for passing steam exhaust from the engine into said chamber, a smoke stack connected with said chamber, a channel being operatively connected with said exhaust means and passing spirally around the inner surface of the wall of said chamber towards said smoke stack, and a cinder outlet opening into said chamber and being operatively connected with said channel, and a conduit positioned outside of said chamber and being connected with said cinder outlet.

8. In an engine, a smoke chamber, means for passing steam exhaust from the engine into said chamber, a smoke stack connected with said chamber, a channel being operatively connected with said exhaust means and passing spirally around the inner surface of the wall of said chamber towards said smoke stack, and a cinder outlet opening into said chamber and being operatively connected with said channel, and a conduit positioned outside of said chamber and being connected with said cinder outlet, said engine having a fire place and said conduit being operatively connected with said fire place.

In testimony whereof, I hereunto set my hand.

COTTER S. CHALFANT.